C. B. ROSE.
WINDSHIELD.
APPLICATION FILED SEPT. 26, 1919.
1,369,193.
Patented Feb. 22, 1921.
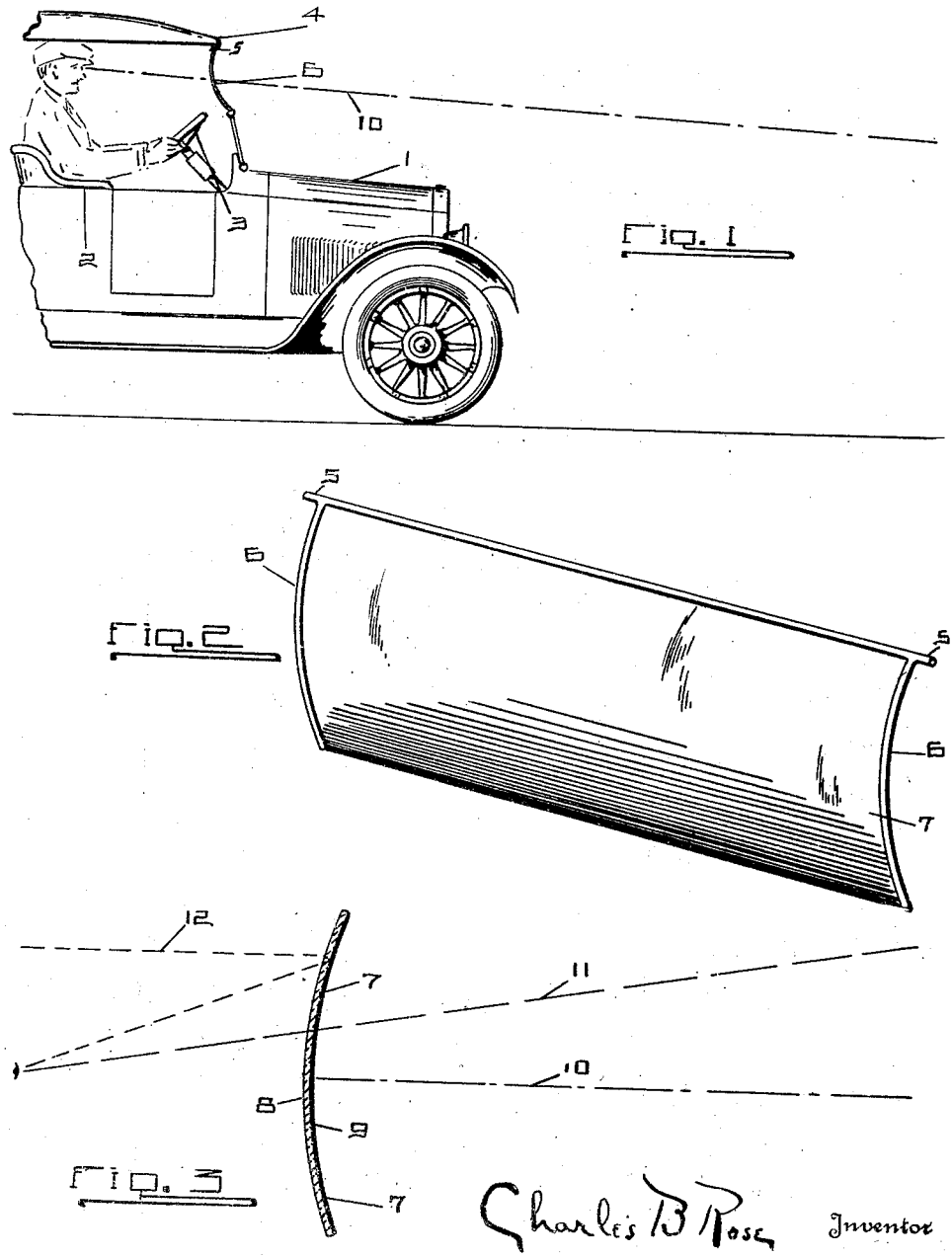

UNITED STATES PATENT OFFICE.

CHARLES B. ROSE, OF TOLEDO, OHIO, ASSIGNOR OF ONE-HALF TO EUGENE BALLOU, OF TOLEDO, OHIO.

WINDSHIELD.

1,369,193.  Specification of Letters Patent.  Patented Feb. 22, 1921.

Application filed September 26, 1919.  Serial No. 326,575.

*To all whom it may concern:*

Be it known that I, CHARLES B. ROSE, a citizen of the United States of America, residing at Toledo, Lucas county, Ohio, have invented new and useful Windshields, of which the following is a specification.

This invention relates to clear vision apparatus.

This invention has utility when incorporated in outlook transparencies, as windshields for motor vehicles.

Referring to the drawings—

Figure 1 is a fragmentary view of a motor vehicle showing an embodiment of the invention incorporated therewith as a windshield;

Fig. 2 is a perspective view of the curved windshield of Fig. 1; and

Fig. 3 is a vertical section of the windshield of Fig. 2, having diagrammatic lines for locating objects as away from the driving vision line.

A motor vehicle 1 is herein shown as having a driver's station 2 in position for a driver readily to control steering wheel 3. A frame 4 has adjusting hinge mounting 5 for a swinging frame 6. This frame 6 has its vertical ends rearwardly bowed or curved medially of their extent. Mounted in the frame 6 is a glass 7. This glass 7 is configured as an arc of a cylinder and for a windshield section 9 inches wide the curvature or bow may be as much as one inch from the chord. The rearward or convex face 8 of this shield 7 is toward the driver's station, while outwardly, its forward side 9 is concave.

In driving, whether the shield 7 be adjusted for ventilation, or it be in closed position, there is a slight emphasis of detail for clearly defining objects in the region of driving vision line 10. If this be due to a slight reduction, it is not of such proportion as to disturb the judgment of the driver in locating the relation between objects nor create a wrong impression as to distance. This is incidental experience as to the driving vision line 10. Forwardly, lateral objects in the horizontal plane of the driving line 10, have the attributes of clear detail and proper position. There does not seem to be refractive disturbance of an extent to cause any mislocating of objects considerably above or below the line of driving vision 10. In fact such lateral vision seems to be of better or improved detail and in no way confusing with the driving line objects. In this connection approaching driving lights, even of intensity, seem to have the rays or fringe cut down to such an extent that the roadway may be kept with less hazard from such objectionable glares.

Reflections upon a windshield, especially from lights, as in night driving, may be disastrously confusing. However, in the device of this disclosure, the transparency 7 automatically moves the reflected objects or lights of line 12, from approximating the horizontal plane of car travel, up to a region on the windshield 7 a considerable distance away from the driving vision line 10, and further seems to flatten out the reflected objects or lights. This makes possible a ready identification of a reflected from a transmitted light as to the shield 7. With the region of driving vision thus automatically cleared of reflected lights of rearward approaching or receding vehicles, there is no confusion as to an approaching car headlights, nor may there be confusion as to a taillight of a rearward receding car as one going the same direction as the car carrying the windshield of the invention herein.

It has also been experienced that moisture accumulation on the concave face 9 of the shield 7 does not objectionably interfere with clear vision driving. This may be due to the refractive action of the curved shield neutralizing refractive tendencies of moisture accumulation.

What is claimed and it is desired to secure by Letters Patent is:

A self-propelled vehicle provided with a driver's station and steering means adjacent said station to be controlled by the driver, and a windshield for the driver forwardy from the station, said windshield comprising a glass rigidly convex toward said station.

In witness whereof I affix my signature.

CHARLES B. ROSE.